US010454078B2

(12) United States Patent
Kountz et al.

(10) Patent No.: US 10,454,078 B2
(45) Date of Patent: Oct. 22, 2019

(54) LI-ION BATTERY HAVING IMPROVED SAFETY AGAINST COMBUSTION

(71) Applicant: THE CHEMOURS COMPANY FC LLC, Wilmington, DE (US)

(72) Inventors: Dennis J. Kountz, West Chester, PA (US); James R. Hoover, Newark, DE (US); George Martin Pruce, Glastonbury, CT (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 13/973,261

(22) Filed: Aug. 22, 2013

(65) Prior Publication Data

US 2014/0065461 A1    Mar. 6, 2014

Related U.S. Application Data

(60) Provisional application No. 61/703,942, filed on Sep. 21, 2012, provisional application No. 61/694,891, filed on Aug. 30, 2012.

(51) Int. Cl.
*H01M 10/50*    (2006.01)
*H01M 2/02*    (2006.01)
(Continued)

(52) U.S. Cl.
CPC ........... *H01M 2/0267* (2013.01); *C09K 21/14* (2013.01); *H01M 2/0287* (2013.01);
(Continued)

(58) Field of Classification Search
CPC .................................................. H01M 10/503
See application file for complete search history.

(56) References Cited

U.S. PATENT DOCUMENTS 5,132,368 A  *  7/1992  Chapman, Jr. ...... B29C 47/0883
                                                                525/165
5,214,343 A      5/1993  Baumoel
(Continued)

FOREIGN PATENT DOCUMENTS

JP    2000-067825 A    3/2000
JP    2003-238821 A    8/2003
(Continued)

OTHER PUBLICATIONS

Dahlia Haynes et al., Poly(L-lactic acid) with Segmented Perfluoropolyether Enchainment, Macromolecules 2007, 40, 9354-9360.*

(Continued)

*Primary Examiner* — Barbara L Gilliam
*Assistant Examiner* — Zhongqing Wei

(57) ABSTRACT

A Li-ion battery is provided in combination with fluorinated material positioned effective to abate combustion by said battery, the fluorinated material being normally non-gaseous and non-liquid and being itself effective to provide the combustion abatement by said battery, such fluorinated material being is such forms as the material of construction of the battery case containing the battery, film wrapped around said battery, and/or semi-solid material at least proximate to the battery, such as by forming a coating on said battery or said film on said battery.

14 Claims, 5 Drawing Sheets

(51) Int. Cl.
*H01M 2/10* (2006.01)
*H01M 2/20* (2006.01)
*C09K 21/14* (2006.01)
*H01M 10/0525* (2010.01)
*H01M 4/66* (2006.01)

(52) U.S. Cl.
CPC ....... *H01M 2/1077* (2013.01); *H01M 2/1094* (2013.01); *H01M 2/20* (2013.01); *H01M 2/202* (2013.01); *H01M 2/0292* (2013.01); *H01M 4/667* (2013.01); *H01M 10/0525* (2013.01)

(56) References Cited

U.S. PATENT DOCUMENTS

| | | | |
|---|---|---|---|
| 5,593,552 A * | 1/1997 | Joshi | B01J 7/00 204/230.5 |
| 5,716,665 A * | 2/1998 | Vita et al. | 427/119 |
| 6,566,013 B2 * | 5/2003 | Nakamizo et al. | 429/303 |
| 7,332,242 B2 | 2/2008 | Sato et al. | |
| 7,763,680 B2 | 7/2010 | Aten et al. | |
| 7,883,554 B2 | 2/2011 | Cho et al. | |
| 2004/0219424 A1 | 11/2004 | Kanno et al. | |
| 2005/0014072 A1 * | 1/2005 | Yamaguchi et al. | 429/329 |
| 2007/0117935 A1 | 5/2007 | Aten et al. | |
| 2008/0131764 A1 * | 6/2008 | Saiki | H01M 2/1083 429/149 |
| 2008/0166631 A1 * | 7/2008 | Takahashi et al. | 429/185 |
| 2009/0069480 A1 * | 3/2009 | Zangara | C08K 3/22 524/405 |
| 2009/0176148 A1 | 7/2009 | Jiang et al. | |
| 2009/0280400 A1 | 11/2009 | Tsukamoto | |
| 2010/0047673 A1 | 2/2010 | Hirakawa et al. | |
| 2010/0136404 A1 * | 6/2010 | Hermann et al. | 429/120 |
| 2011/0177366 A1 | 7/2011 | Nagasaki et al. | |
| 2011/0281154 A1 | 11/2011 | Vissers et al. | |

FOREIGN PATENT DOCUMENTS

| | | |
|---|---|---|
| JP | 2007-200880 A | 8/2007 |
| JP | 2008-288091 A | 11/2008 |
| KR | 2004-0023882 A | 3/2004 |
| WO | 2009/108374 A1 | 9/2009 |

OTHER PUBLICATIONS

PCT International Search Report and Written Opinion dated Dec. 12, 2013.
Kasai, Paul H., Perfluoropolyethers with Acid End Groups: Amphiphilicity and Emulsification, Journal of Applied Polymer Science, 1995, vol. 57, Issue 7, pp. 797-809.
U.S. Appl. No. 13/973,311, filed Aug. 22, 2013.

* cited by examiner

LI-ION BATTERY HAVING IMPROVED SAFETY AGAINST COMBUSTION

FIELD OF THE INVENTION

This invention relates to materials for use with Li-ion batteries to abate their combustion.

BACKGROUND OF THE INVENTION

A lithium-ion battery (Li-ion battery) is a battery in which lithium ions move between oppositely charged electrodes to generate electricity.

The corrupting (malfunctioning) of a Li-ion battery, such as by short circuiting within the battery, is known to be capable of producing a runaway thermal reaction that vaporizes combustible components within the battery, especially from the electrolyte separating each anode from each cathode of the battery. Combustion of the battery involves ignition of the combustible vapors, especially upon reaching oxygen present in air that comes into contact with the combustible vapors, either within the battery pack case within which the battery is housed or exterior to the battery pack from which the combustible vapors escape.

In an effort to stop the flow of electricity to the compromised battery, battery packs have been equipped with fusing that stops electricity flow upon an excessive rise in temperature caused by the run-away thermal reaction within the battery.

Because the electrical approach has not always been effective in abating the combustion, various other techniques have been tried.

U.S. 2011/0177366 discloses the formation of the case of the battery pack as a laminate of (i) a heat conductive layer of metal or resin having high heat conductivity such as an engineering plastic and (ii) a heat absorbing layer of resin materials, ceramic materials or inorganic materials. Layer (i) forms the outside of the case and layer (ii) forms the inside of the case, so that the heat absorbed by layer (ii) is conducted away from the interior of the batter pack case by layer (i). Fluorocarbon resin is disclosed as a possible material for layer (ii), and polytetrafluoroethylene (PTFE) is disclosed as an example of resin having superior heat resistance. The PTFE heat absorbing layer is disclosed to contain 20 to 70 parts by weight of particulate material called material B dispersed therein, and the PTFE is disclosed to have excellent binding property. The function of the particulate material B in layer (ii) is to undergo a heat decomposition reaction, which absorbs heat and expands the layer (ii) to form an insulating layer to protect electronic devices outside the battery pack case. Sodium hydrogen carbonate and aluminum hydroxide are disclosed as examples of material B. As apparent compensation of the insulating effect of the insulating layer (ii) after heating, the battery pack is also provided with a sinusoidal conduit 25 (FIG. 2) for allowing escape of hot gases from the interior of the battery pack case and air cooling this gas as it flows along the length of the conduit. The approach of this patent publication is to try to avoid emission of a high temperature inflammable gas from the inside of the battery pack by limiting the temperature rise within the battery pack and cooling the gas escaping from the battery pack.

U.S. 2009/0176148 discloses the immersion of batteries into a container filled with a heat transfer fluid, and containing a heat exchange at least partially filled with the heat transfer fluid, wherein the fluid is a liquid or gas, such as water, glycols, perfluorocarbons, perfluoropolyethers, perfluoroamines, perfluoroethers, silicone oil and hydrocarbon oils and the heat exchanger contributes the removal of heat from the immersed batteries. In another embodiment, the heat transfer fluid is a hydrofluoroether that has a low boiling temperature, e.g. less than 80° C. or even less than 50° C., the vaporization of this fluid contributing to the heat removal from the immersed batteries. A disadvantage of this approach to improving the safety of batteries, i.e. combustion abatement, is the reliance on gas and/or liquid as the transfer fluid. Gas or liquids within the battery pack case are prone to escape upon any opening being formed in the case, such as by subjecting the case to an impact.

U.S. 2010/0047673 discloses filling the space between the battery pack case and the batteries containing within the case with a nonflammable filling material so as to exclude air from the inside of the case. In one embodiment, liquid or gas is used as the filling material and either contained within a polypropylene bag or absorbed into a high polymer to provide a gel-like material. Example 12 discloses the preparation of a filling material by kneading 90 w % magnesium hydrogen carbonate powder that releases carbon dioxide when overheated, with 10 wt % PTFE having a bonding effect, in a mortar, the resulting mixture then being molded into pellets, which then becomes the filling material within the battery case. One skilled in the art knows that for the PTFE to have a bonding effect, the PTFE must be the fine powder type, made by aqueous dispersion polymerization, followed by coagulation of the dispersed PTFE particles, the resulting coagulum being called the fine powder type of PTFE. This PTFE fine powder, prior to sintering, fibrillates when subject to shear as occurs in mixing in a mortar. The fibrils making up the fibrillated PTFE act as a bonding agent for particulate material such as the magnesium hydrogen carbonate used in Example 12. It is clear that in this application, the PTFE is used for its bonding ability, with the magnesium hydrogen carbonate being the fire suppressant in the filling material.

There is a still a need for an effective way of abating combustion by a Li-ion battery.

SUMMARY OF THE INVENTION

The present invention has found that fluorinated material that is neither gaseous nor liquid acts to abate combustion by a Li ion battery. Thus, one embodiment of the present invention is a Li-ion battery having fluorinated material positioned effective to abate combustion by said battery, said fluorinated material being normally non-gaseous and non-liquid and being itself effective to provide the abatement of said combustion by said battery. The positioning of the fluorinated material is with respect to the Li-ion battery. By abatement of combustion is meant that the combustion never occurs even though the corruption of the Li-ion battery is such that the run-away exothermic reaction is expected, or if combustion commences, its intensity is reduced or the fire is very quickly extinguished. Reduced intensity means that when a plurality of Li-ion batteries are present within the case of the battery pack, the combustion tends to be limited to just the corrupted battery, which is then be readily extinguished. By non-gaseous and non-liquid is meant under normal conditions, i.e. at ambient temperature (15-25° C.) and under a pressure of one atmosphere (1 MPa). The combination of these conditions and state of matter can also be expressed as normally non-gaseous and non-liquid. By being itself effective means additional non-fluorinated material that acts on (interacts with) the combustion to abate it is essentially unnecessary. This does not exclude other independent combustion abatement measures such as fusing.

Another embodiment of the present invention is a battery pack comprising a case, at least one Li-ion battery contained in said case, and fluorinated material positioned effective to abate combustion by said battery, said fluorinated material being normally non-gaseous and nonliquid and being itself effective to provide the abatement of said combustion by said battery. Preferably, the fluorinated material is either the material of construction of the battery case or is positioned within the battery case or both.

Each embodiment is applicable to one or more Li-ion batteries interconnected to provide electricity, i.e. the positioning of the fluorinated material is applied to each battery present, such as may be contained within the case of a battery pack.

In each of these embodiments, the following preferences apply, individually and in any combination:

(a) The fluorinated material is preferably not a carrier material for a non-fluorinated material having the function of combustion abatement. Thus, the fluorinated material is essentially free of binding function with respect to non-fluorinated material. The primary function of the fluorinated material is combustion abatement. If the fluorinated material contains non-fluorinated material, the amount of non-fluorinated material contained by the fluorinated material is preferably no more than 15 wt % of the combined weight of fluorinated material and non-fluorinated material, more preferably no more than 10 wt %, even more preferably, no more than 5 wt %, and for simplicity, most preferably, none.

(b) The positioning of the fluorinated material is preferably at least proximate to said battery. This proximity also applies to each Li-ion battery in the electrical circuit. At least proximate includes the fluorinated material being in contact with the Li-ion battery, and when not in contact, then being near the Li-ion battery or both. This proximity enables the fluorinated material to provide the combustion abatement effect. While being positioned effective to provide this effect, this positioning is preferably without any metallic structure intervening between the battery and the fluorinated material, whereby the fluorinated material is directly exposed to the combustion condition arising from the corrupted battery, so as to provide combustion abatement. Thus, for example, the fluorinated material is not a laminate with a metal layer facing the battery. At least proximate to the battery includes the fluorinated material being positioned inside the can of the battery and/or outside the can. When positioned inside the can the fluorinated material and its location inside the can is such as to be non-interfering with the performance of the battery as compared to the fluorinated material not being present inside the can, i.e. the fluorinated material has no appreciable detrimental effect on the electrical performance of the battery.

(c) The fluorinated material can comprise one or more fluorinated materials having different states and positions with respect to the Li-ion battery. For example, when the Li-ion battery is contained within a case to form a battery pack, the fluorinated material can include fluoropolymer that forms at least the interior surface of said case as a case liner. Alternatively, the case can be made entirely of said fluoropolymer, i.e. the material of construction of the case is fluoropolymer. To serve as the material of construction of the case, the fluoropolymer must be in the solid state and have strength to withstand handling of the battery pack without breaking. As a case liner, the fluorinated material can be either in the semi-solid or solid state. Application of the fluorinated material as a battery case or its liner is an example of at least proximate positioning of the fluorinated material with respect to the battery contained in the case. In this example, portions of the battery may be in contact with the interior surface of the case, while other battery portions will be out of contact with but proximate to the interior surface of the case. The fluorinated material is considered positioned within the case even though the material is the material of construction of the case. The applications of fluorinated material as a case liner and as described in paragraphs (e),(f), and (g) just below are also examples of the preference for positioning the fluorinated material within the battery case (d) The fluorinated material can also include a fluoropolymer film in contact with the Li-ion battery. This film is of course also solid and possesses sufficient strength enabling handling of the film without its breakage. A preferred method of establishing contact between the film and the Li-ion battery is to wrap the film around the battery. Alternatively, instead of the film being in contact with the outside of the battery, the film/battery contact can be established by the film being inside the battery, e.g positioned between the can of the battery and the electrodes of the battery.

(e) In one embodiment, the fluorinated material can also include fluorinated material that comprises a fluoropolyether. In another embodiment, the fluorinated material can be a semi-solid. This semi-solid (state) is the normal state, i.e. the state under the normal conditions of temperature and pressure mentioned above. The fluorinated material as a semi-solid can be fluoropolyether. The semi-solid state facilitates positioning of the fluorinated material such as fluoropolyether at least proximate to the Li-ion battery, such as by forming as a coating on at least a portion of the Li-ion battery, preferably as a coating over the surface of the battery where the "hotspot" is most likely to occur that leads to battery combustion, and most preferably over substantially the entire surface of the battery. Certain edges of the battery, where battery exterior surfaces come together may have no danger of being the location of any hotspot resulting from corruption of the battery, in which case, coating of such edges by the fluorinated material may be unnecessary from a battery safety standpoint.

(f) In another embodiment, the fluorinated material can be thermally destabilizable fluoropolymer. This fluoropolymer is normally solid, but under heating by corruption of the Li-ion battery, this fluoropolymer decomposes to provide combustion abatement.

(g) In another embodiment, the fluorinated material can also include a mixture of fluorinated composition and other fluorinated material. The other fluorinated material is preferably a solid and preferably a fluoropolymer, and most preferably, both. The preferred fluoropolymer is the thermally destabilizable fluoropolymer mentioned under (f) above. The fluorinated composition preferably comprises a fluoropolyether. The mixture is preferably semi-solid. In still another embodiment, the mixture is semi-solid and the fluorinated composition in the mixture comprises fluoropolyether. Preferably the fluorinated composition, such as that comprising fluoropolyether, in the mixture is by itself liquid, but the mixture with other fluorinated material, preferably solid fluoropolymer, containing this liquid is non-liquid. The mixture is preferably semi-solid. In still another embodiment, the semi-solid mixture comprises solid fluorinated material and fluorinated composition such as described above having a low enough molecular weight that when mixed with the solid fluorinated material, the resultant mixture is semi-solid. Preferably the other fluorinated material, such as comprising fluoropolyether, is by itself a liquid.

The liquid, non-liquid, solid, semi-solid characterizations (states) disclosed above and later herein are the normal states, i.e. the states under the normal condition of temperature and pressure mentioned above unless otherwise indicated. Thus, these characterizations can be understood as being the same as normally liquid, normally non-liquid, normally solid, and normally semi-solid. The mixture, preferably that which is semi-solid, can positioned at least proximate to the Li-ion battery, such as by a coating formed on the Li-ion battery the same as described in the preceding paragraph.

(h) The fluorinated material can be a combination of fluorinated materials positioned separately with respect to the Li-ion battery to provide a multiplicity of defenses against combustion by the Li-ion battery. In one embodiment, the fluoropolymer film described above can be used in combination with the either the fluoropolyether or the mixture described above. The fluoropolyether and mixture used in this embodiment are preferably semi-solid. In one aspect of this embodiment, the fluorinated material includes a fluoropolymer film in contact with said battery and fluorinated material that is either (i) a mixture of solid fluoropolymer and fluorinated composition, or (ii) in the semi-solid state, or (iii) both. The preferred fluorinated composition comprises fluoropolyether. In another embodiment wherein the Li-ion battery is contained in a case to form a battery pack, the fluorinated material can include fluoropolymer that forms at least the interior of the case or as the material of construction of the case as described above and said fluorinated material includes (a) fluoropolymer film in contact with said battery and/or (b) fluorinated material that is either (i) a mixture of solid fluoropolymer and fluorinated composition as described above, or (ii) in the semi-solid state as described above, or (iii) both. Application of the film and the fluorinated material (i), (ii) and (iii) with respect to the Li-ion battery, can be as described above. The preferred fluorinated composition under (i) and fluorinated material under (ii) comprises fluoropolyether.

By semi-solid (state) in all of these descriptions thereof and embodiments is meant, that the fluorinated material, such as the fluoropolyether or the fluorinated composition in the mixture described above, is neither a gas nor a liquid under the normal conditions of temperature and pressure mentioned above. Preferably, this semi-solid state persists at the higher temperatures encountered in the normal operation of that the Li-ion battery (and battery pack), including recharging, when the battery is a rechargeable battery. Normal operation of the battery can include ambient temperature (15-25° C.) and higher temperatures up to 40° C., sometimes up to 50° C. and even higher, e.g. temperatures up to 60° C. and even up to 80° C. and for simplicity, under a pressure of one atm. The semi-solid state of the mixture differs from the liquid state by not being flowable at any of these temperatures and pressure conditions. In contrast, the liquid state denotes flowability so as to take the shape of its container, while having a fixed volume. Instead of flowability, the semi-solid state of the fluorinated material means that it has rigidity, whereby it stays where it is positioned in the battery case. This positioning of the fluorinated material is facilitated by the characteristic of the semi-solid state of the mixture, namely that the mixture is flowable enough under pressure for achieving intimate contact with desired surfaces within the battery pack, e.g. each batteries and/or its connectors. The applied pressure may be only that of a hand trowel used to apply and spread the semi-solid within the battery case where desired, such as on the battery and on the connectors to form a coating thereon. Once applied and the pressure is removed, the semi-solid state of the fluorinated material results it not flowing away from its applied position under the normal operation of the Li-ion battery and its battery pack. Characteristic of being semi-solid, the fluorinated material in this state has the consistency of wax, dough, or putty, the stiffness of which can be controlled for example by the molecular weight of the fluorinated material or of the fluorinated composition in the mixture and the proportion thereof mixed with the other fluorinated material such as solid fluoropolymer. When fluorinated composition by that is used in the mixture to obtain the semi-solid state of the mixture is by itself a liquid under the above mentioned temperatures, this is indicative of a low molecular weight for the fluorinated composition such as fluoropolyether, as compared to the molecular weight of solid fluorinated material such as fluoropolymer in the mixture. Thus, the liquid fluorinated composition has a boiling temperature (at one atm) greater than the particular maximum temperature from those mentioned above that might be encountered by the battery and battery pack under normal operation. The relatively low molecular weight of the fluorinated composition gives it high mobility under the overheating accompanying corruption of the battery, thereby facilitating access of the composition to the area of overheating to abate combustion.

The solid state of the fluoropolymer used as the material of construction of the battery case, battery case liner, and of the film and of the fluoropolymer component of the mixture described above differs from the semi-solid state, by exhibiting rigidity, but not the flowability under pressure mentioned above. Thus, the solid fluoropolymer does not have the consistency of wax, dough, or putty. The mixing together of the solid fluoropolymer and liquid fluorinated composition provides the preferred semi-solid state of the resultant mixture. In one embodiment, the fluoropolymer in each of its applications as fluorinated material described above resists deformation as indicated by it exhibiting tensile strength of at least 1 MPa (ASTM D638 at 23° C.), preferably at least 5 MPa. The semi-solid state can be characterized by exhibition of a tensile strength of zero typically by virtue of the inability to form tensile test specimens that have sufficient integrity to be tensile strength tested.

The fluorinated material in each of the applications described above with respect to the present invention provides combustion abatement. Whether to use a combination of fluorinated materials as described above and which combination to use will depend on the particular Li-ion battery and battery pack containing the Li-ion battery (batteries) under consideration for combustion abatement. While the fluorinated material in the applications mentioned above is stable under the temperatures that might be encountered by the Li-ion battery and battery pack in normal operation as mentioned above, the much higher temperatures reached when the battery is corrupted by such non-normal event as short circuiting, improper recharging, or other malfunction results in the fluorinated material abating combustion by the battery.

DETAILED DESCRIPTION OF THE INVENTION

Figure 1:
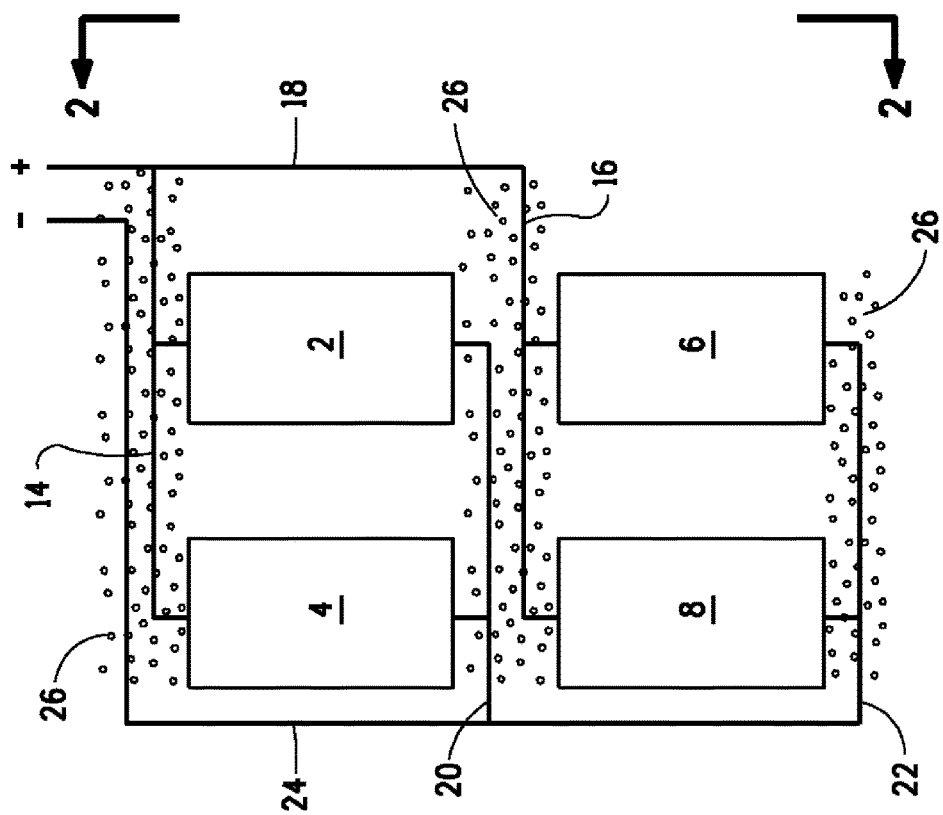
FIG. 1 is a schematic plan view of an array of four Li-ion batteries, including their electrical interconnection, showing one embodiment of application of the semi-solid mixture of the present invention.

The batteries in FIG. 1 are the jelly-roll type of Li-ion batteries 2, 4, 6, and 8, wherein layers of anode, electrolyte, and cathode are rolled up to form a cylindrical shape housed within a cylindrical can. The electrolyte if not acting as a physical separator between the anode and cathode, will include a separator, within which the electrolyte is absorbed. The anode and cathode can also include current collectors. The anodes of batteries 2 and 4 are electrically connected in parallel by buss 14 and the anodes of batteries 6 and 8 are electrically connected in parallel by buss 16. Buss 18 electrically interconnects busses 14 and 16 in series to form the positive terminal for the battery array as shown by the symbol + in FIG. 1. Busses 20 and 22 electrically connect the cathodes of batteries 2 and 4 and 6 and 8, respectively. Buss 24 electrically interconnects busses 20 and 22 to form the negative terminal for the array of batteries as shown by the symbol – in FIG. 1.

Figure 2:
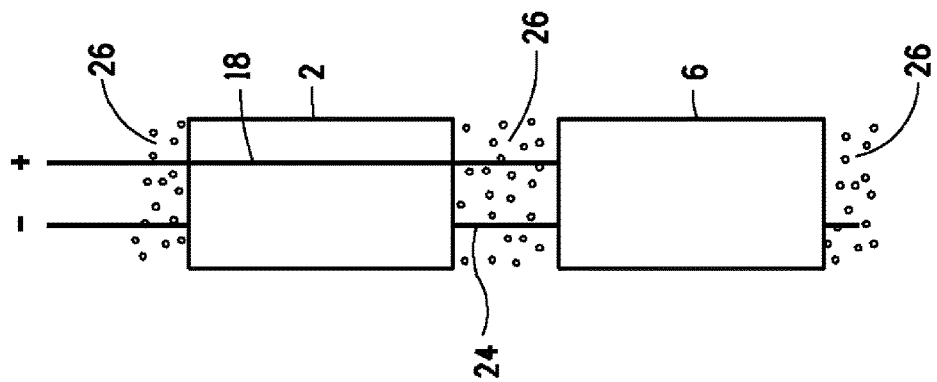
FIG. 2 is a schematic side view of the array of batteries of FIG. 1.

Semi-solid fluorinated material having any of the identities disclosed above is present as a coating 26 on busses 14, 16, 20, and 22 and their underlying anodes and cathodes as shown in FIG. 1. The coating is formed by applying the semi-solid material to the tops (anodes) and bottoms (cathodes) of the batteries 2, 4, 6, and 8 and pressing the material into intimate contact with the current carrying elements on the exterior of each battery. In effect, the coating is formed on both the anode ends and the cathode ends of the batteries and their associated busses as shown in FIG. 2. If desired, the semi-solid fluorinated material can also be applied to form a coating on the uncovered lengths of busses 18 and 24 shown in FIG. 1. Since the current is concentrated at the anode ends of the batteries and the busses conveying this current to the positive terminal, it is preferred that at least these busses (electrical connectors) are coated by the semi-solid fluorinated material. The anodes, cathodes, and busses are all electrical connectors of each battery and the array of batteries.

The fluorinated material applied to connectors such as is present for the coating 26 in FIG. 1 should be electrically non-conductive so as not to cause short circuiting.

The Li-ion battery can be any type, including the prismatic Li-ion battery, wherein anode/electrolyte-separator/cathode layers are stacked on top of one another, and the resultant assemblage of many layers of anode/electrolyte-separator/cathode are housed in a foil barrier layer forming the can of the battery. This foil barrier, preventing electrolyte from escaping and isolation from the atmosphere is often referred to as a pouch. A positive and a negative electrode extend from the exterior of the pouch, these forming the electrical interconnection between the layers of anodes and cathodes, respectively, within the pouch. The prismatic Li-ion battery may not be used in combination with a case, in which situation, the application of the fluorinated material with respect to the prismatic battery will be compatible with the absence of the case.

In another embodiment of the present invention, the semi-solid fluorinated material is positioned as a coating on the exterior of the pouch at least surrounding the electrodes and on the electrode themselves after their interconnection with the device to be powered by the battery. The coated pouched can then be wrapped with fluoropolymer film as a second fluorinated material for abating combustion of the prismatic battery.

The Li-ion battery can be a primary battery or a secondary battery. The feature of rechargeability of the secondary battery makes this a preferred battery for application of the present invention.

Figure 3:
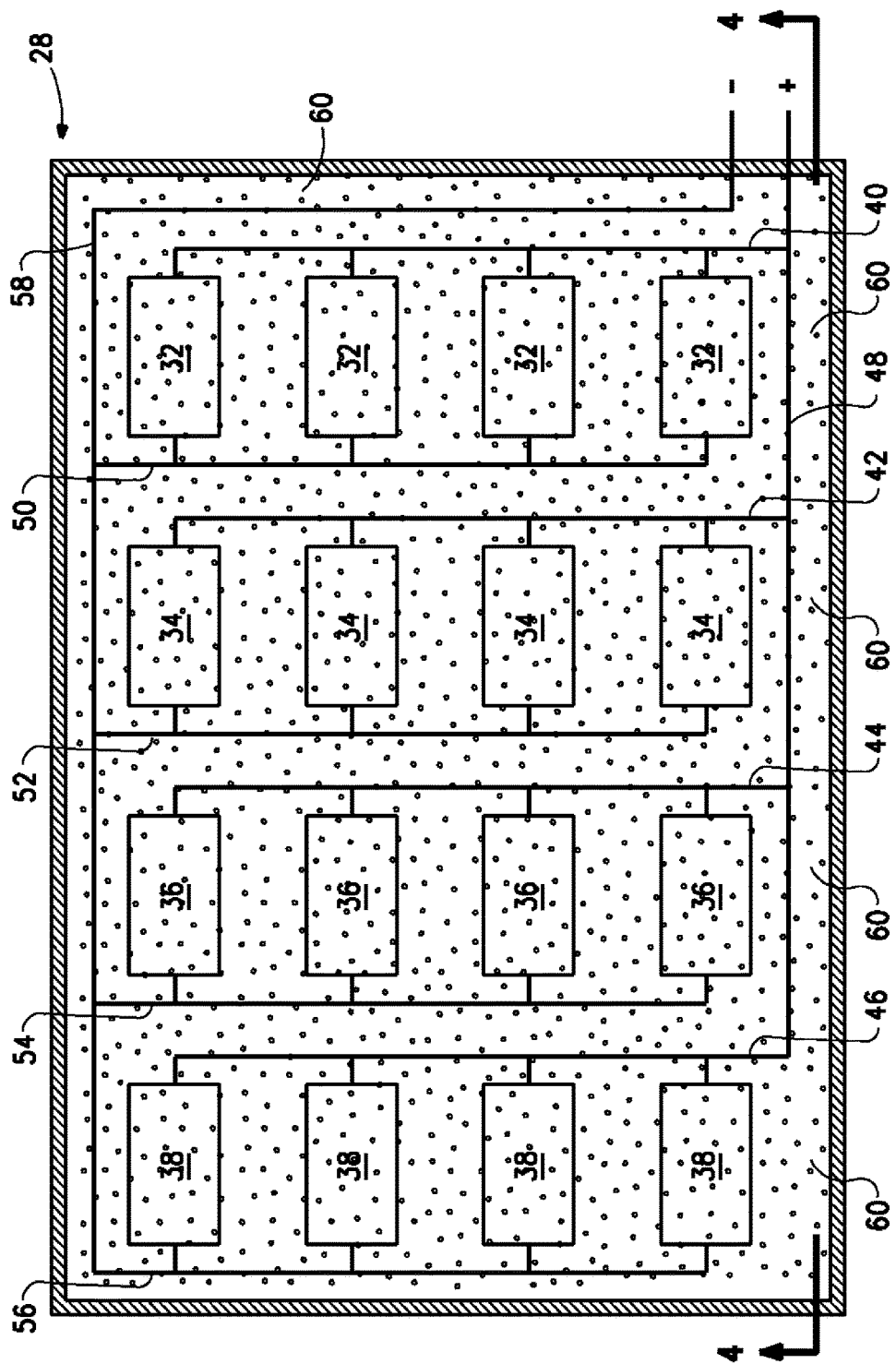
FIG. 3 is a schematic plan view of a battery pack, lid removed, containing an array of sixteen Li-ion batteries and their electrical interconnection showing another embodiment of application of the semisolid mixture of the present invention.

FIG. 3 shows an array of sixteen Li-ion batteries 32, 34, 36 and 38 like the batteries of FIG. 1, but contained within a case 28 to form a battery pack 30. The anodes of batteries 32 are electrically connected by buss 40, of batteries 34 by buss 42, of batteries 36, by buss 44, and of batteries 38 by buss 46. Busses 40, 42, 44, and 46 are electrically interconnected by buss 48 to provide the positive terminal of the battery pack. The cathodes of batteries 32 are electrically connected by buss 50, of batteries 34 by buss 52, of batteries 36 by buss 54, and of batteries 38 by buss 56. Busses 50, 52, 54, and 56 are electrically interconnected by buss 58 to provide the negative terminal of the battery pack. A coating 60 of semisolid fluorinated material is formed on all the surfaces of the batteries and their busses as shown in FIG. 3.

Figure 4:
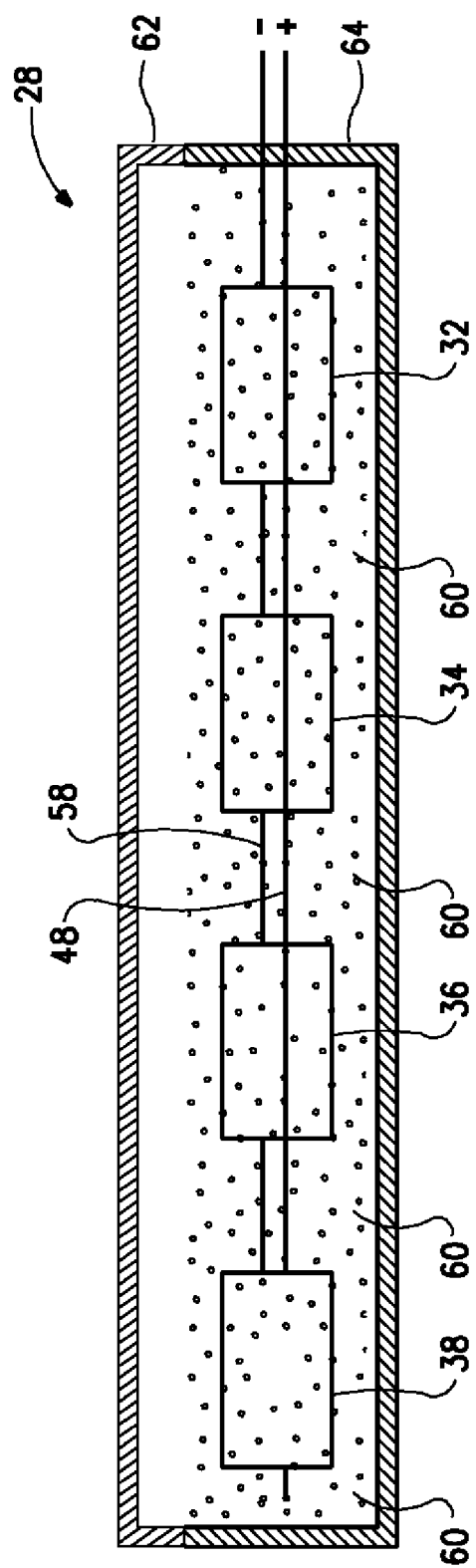
FIG. 4 is a cross-sectional view of the battery pack of FIG. 3, lid in place, taken along line 4-4 of FIG. 3.

FIG. 4 shows that the battery pack case 28 consists of a bottom receptacle 64, within which the array of batteries of FIG. 3 is positioned, and lid 62 in closure position forming the case 28. The semi-solid fluorinated material has sufficient depth to enable the material to form a coating 60 on all the battery surfaces and their busses within the case 28. One embodiment of obtaining the formation of this coating is to first form a bed of the semi-solid fluorinated material within the bottom receptacle 64. Then the array of electrically interconnected batteries can be pressed into this bed. The material that is forced upwards by this pressing can then be spread to form a coating on any uncoated upwards facing surface (batteries and busses), thereby encapsulating the battery array and its busses within the semi-solid mixture. If the amount of semi-solid fluorinated material in the bed is insufficient to coat upwards facing surfaces, then additional material can be added and spread over any uncoated battery/buss surface. The case 28 can then be closed by addition of the lid 62 to the bottom receptacle 64. Li-ion prismatic batteries can be substituted for the jelly-roll batteries of FIGS. 1-4. The semi-solid fluorinated material need not fill up all the space in within the case as shown in FIG. 4; some empty space can exist. Alternatively, most of not all the space within the case can be filled with the semi-solid fluorinated material, thereby encapsulating the array of batteries.

As is apparent from the above description of positioning of the mixture with respect to batteries and connectors, it is preferred that the fluorinated material be semi-solid to enable intimacy of contact to be achieved, especially over irregularly shaped surfaces or surfaces that are not readily accessible. Instead of the fluorinated material forming a direct coating on one or more of these elements, the coating can also be indirect. For example, a battery may have a wrap of fluoropolymer film thereon, and the mixture is formed as a coating on top of the film wrap.

Figure 5A:
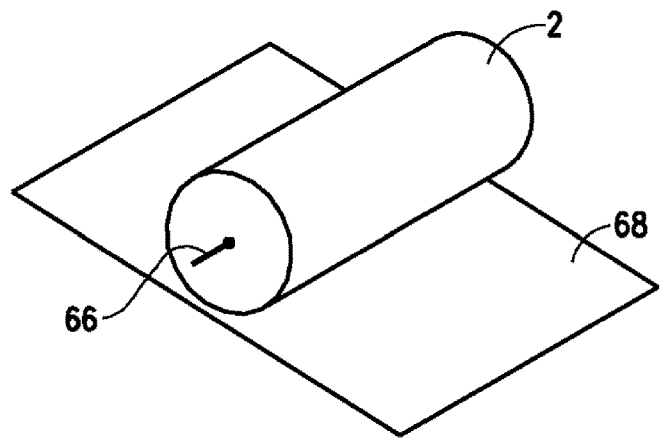
FIG. 5a is an isometric view of a Li-ion battery placed on a fluoropolymer film.
Figure 5B:
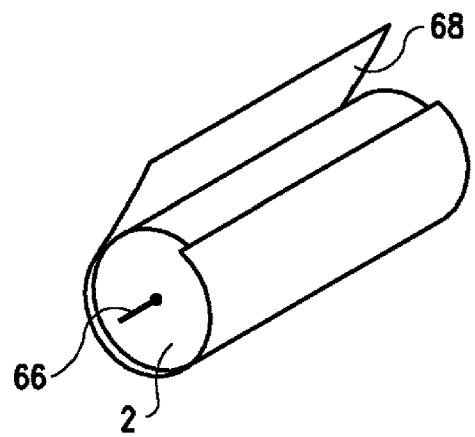
FIG. 5b is the battery of FIG. 5a showing the film partially wrapped around the battery.
Figure 5C:
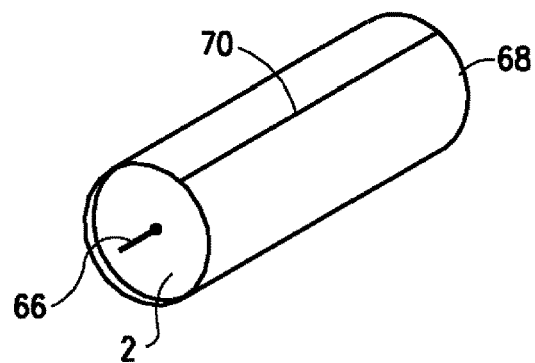
FIG. 5c is the battery of FIG. 5b showing the film completely wrapped around the battery to form a seam.

FIG. 5a shows a Li-ion battery 2, the same as shown in FIG. 1 having an anode connector 66 extending from one end of the battery. The battery 2 rests on a fluoropolymer film 68. If FIG. 5b, the film 68 is partially wrapped around the lateral surface of the battery 2. In FIG. 5c, the film 68 is entirely wrapped around the lateral surface of the battery 2 to form a seam 70. The seam is maintained closed by conventional means (not shown) for maintaining the overlap of fluoropolymer film without the use of flammable material. The film wrap can be used on any Li-ion battery in any arrangement within a battery case. For example, the battery 2 of FIG. 5c can be substituted for the batteries 32, 34, 36, and 38 in FIG. 3 prior to application of the fluorinated material to form a coating 60 on top of film 68.

Figure 6:
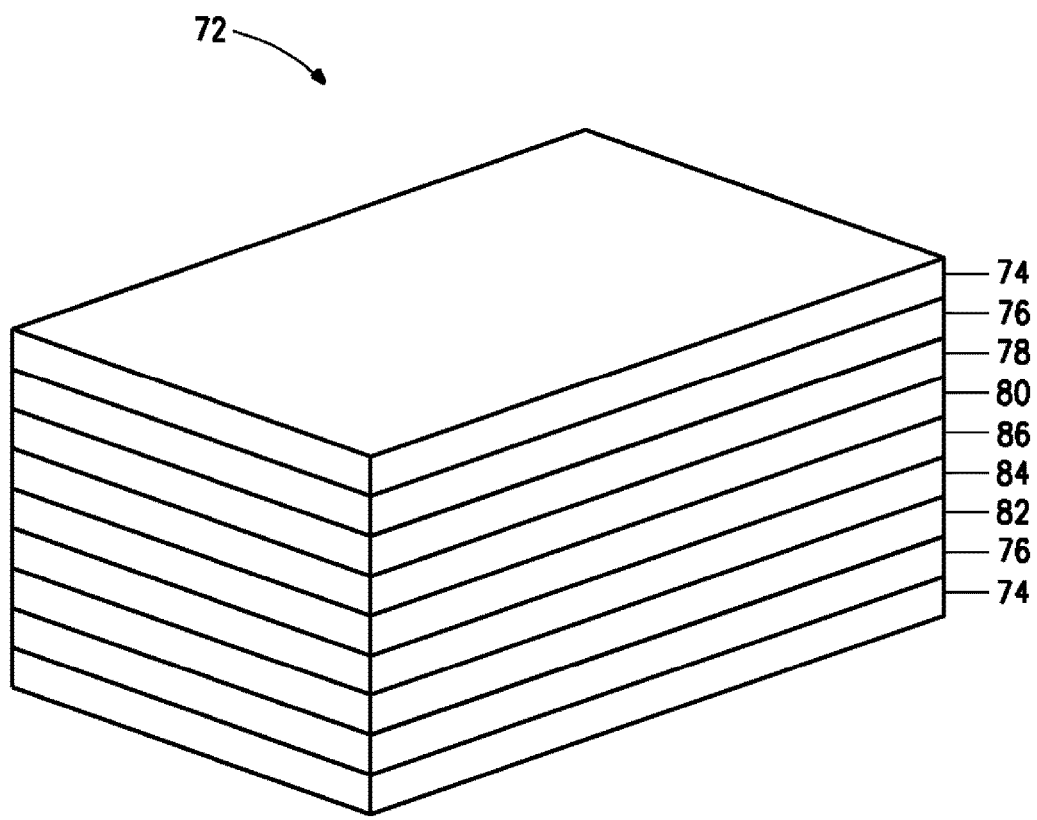
FIG. 6 is a schematic isometric view of the layers of materials present in a prismatic battery cell and containing layers of fluorinated material for abatement of combustion.

FIG. 6 shows another embodiment of the present invention wherein the fluorinated material is positioned inside the battery instead of outside the battery, i.e. inside the can of the battery instead of outside the can of the battery as in the embodiments of FIGS. 1-5a, b, and c. In FIG. 6, the battery is the prismatic battery 72 made up of a stack of layers of materials, as follows:
metal foil 74 forming the top and bottom layers of the battery 72,
fluorinated material layer 76 adjacent each metal foil layer,
anode current collector layer 78 adjacent to one of the layers 76,
ionically active layer 80 adjacent to anode current collector layer 78,
cathode current collector layer 82 adjacent to the other fluorinated material layer 76,
ionically active layer 84 adjacent to the cathode current collector layer 82, and porous separator layer 86 positioned between the layers 80 and 84.

For simplicity, the metal foil layers are not shown enveloping the sides of the other layers to form the can (pouch) of the battery 72, and tabs of the anode and cathode current collectors are not shown extending through the pouch for electrical connectivity.

The metal foil layers 74 are preferably of aluminum and are preferably coated (not shown) on both surfaces (top and bottom) with polymer for electrical insulation purposes. Further mention of the metal foil layer includes the preference for these polymer coatings being present on the metal foil of the metal foil layer. The polymer coating on the surface of the metal foil layer 74 facing the outside of the of the battery is preferably polyamide and the polymer coating of the surface of the metal foil layer facing the inside of the battery is preferably polypropylene. The fluorinated material layers 76 are preferably a fluoropolymer film forming each such layer. The anode current collector layer 78 is preferably copper, and the cathode current collector 82 is preferably aluminum. The fluorinated material layers 76 such as in film form can be in contact with their respective current collector layers 78 and 82. The fluorinated material layers 76 such as in film form can also be in contact with their respective metal foil layers 74. The fluorinated material, preferably in film form, can be separate from, i.e. not bonded to, the adjacent metal foil layer and/or the adjacent current collector layer. The ionically active layers 80 and 82 are preferably coatings on their respective current collector layers 78 and 82. An example of the layer 80 is lithiated graphite and binder, and an example of the layer 82 is lithiated metal oxide and binder. The combination of layers 78 with 80 and 82 with 84 form the electrodes of the battery. The porous separator layer 86 is a porous material containing electrolyte, the pores permitting the passage of lithium ions during discharge. The porous material separator may be polymeric, wherein the polymer is by itself hydrophilic or has a hydrophilic coating on the surfaces of the separator, including its pores, The fluorinated material used for combustion abatement in the present invention are themselves non-flammable under the conditions of combustion encountered in corruption of the Li-ion battery.

With respect to use of fluoropolymer as the fluorinated material in such applications as battery case, lining of the case interior surface, case material of construction, film, and solid fluoropolymer such as being the solid component of the mixture with fluorinated composition or as solid filling as particles surrounding the Li-ion battery within a battery case, the identity of the fluoropolymer will vary with the particular application. In general, for all these applications, the fluoropolymer, including the thermally destabilizable fluoropolymer, preferably comprises of a carbon atom backbone as the polymer chain, —C—C—C—CC—C—C—C—C—C—$C_x$—, wherein x is the number of additional carbon atoms present which together with the substituents on the polymer chain provide the molecular weight desired for the fluoropolymer, and making the fluoropolymer solid. Fluoropolymers having molecular weights of at least 50,000 (Mn) are commercially available, making it convenient to use these fluoropolymers. The fluoropolymer is also preferably solid at least at the temperatures encountered under normal operation of the Li-ion battery and its battery pack as mentioned above. At higher temperatures encountered when the Li-ion battery becomes corrupted, the fluoropolymer may melt. Preferably, however, the melting temperature of the fluoropolymer is at least 200° C. Alternatively, the fluoropolymer may be one which softens upon heating, rather than having a distinct melting temperature. In either case, the fluoropolymer is preferably melt flowable. Nevertheless, the fluoropolymer remains solid under normal operation of the Li-ion battery as mentioned above.

Preferably, he fluoropolymer contains at least 50 wt % fluorine, preferably at least 60 wt %, and more preferably at least 70 wt % fluorine, based on the total weight of the fluoropolymer (excludes end groups). In one embodiment of the present invention, if hydrogen were present in the repeat units making up the polymer chain, it is preferred that hydrogen is only mono-substituted on any of the carbon atoms making up the polymer chain or in any side group bonded to the polymer chain, since the presence of —$CH_2$— can impair the non-flammability of the fluoropolymer. Preferably, the hydrogen content, if any, is no greater than 2 wt %, more preferably no greater than 1 wt %, and most preferably no greater than 0.5 wt %, based on the total weight of the fluoropolymer. A small amount of hydrogen along the polymer chain can have a beneficial effect of thermally destabilizing the fluoropolymer, thereby assisting its combustion abatement effect, as will be discussed below. In another embodiment of the present invention, the fluoropolymer is a perfluoropolymer. By perfluoropolymer is meant that the monovalent substituents on the carbon atoms forming the polymer chain of the polymer are all fluorine atoms, with the possible exception of end groups.

Preferred fluoropolymers in each of the applications mentioned above are those that are melt-processible tetrafluoroethylene copolymers, for example comprising at least 40-99 mol % tetrafluoroethylene (TFE) derived (by polymerization) repeat units and 1-60 mol % of units derived from at least one other comonomer, to total 100 mol %. Preferred comonomers with TFE to form perfluoropolymers are perfluoroolefins having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers in these TFE copolymers and those described below are those in which the alkyl group contains 1, 2, or 3 carbon atoms, and the copolymer can be made using several PAVE monomers. Preferred TFE copolymers include FEP (TFE/HFP copolymer and TFE/HFP/PAVE copolymer) and PFA (TFE/PAVE copolymer), wherein PAVE is most preferably perfluoro (ethyl vinyl ether)(PEVE) or perfluoro(propyl vinyl ether) (PPVE), or the combination of perfluoro(methyl vinyl ether) (PMVE) and PPVE, i.e. TFE/PMVE/PPVE copolymer, sometimes referred to as MFA. Less preferred is a fluoropolymer that has —$CH_2$— units in the polymer chain, such as THV (TFE/HFP/VF$_2$ copolymer). The FEP preferably contains 5 to 17 wt % HFP, the remainder being TFE, with PAVE content if present being 0.2 to 2 wt % based on the total weight of the FEP. The PFA preferably contains at least 2 wt % PAVE, the remainder being TFE, based on the total weight of the PFA.

With respect to the application wherein the fluoropolymer is a solid component of the mixture with fluorinated composition, in one embodiment such solid fluoropolymer is thermally destabilizable. The destabilization of the fluoropolymer when exposed to the heat (temperature) preceding or accompanying combustion by the Li-ion battery provides combustion abatement effect. Destabilization of the fluoropolymer results in its decomposition. Fluoropolymers are known for their thermal stability, especially arising from the strong chemical bonding between carbon and fluorine atoms predominating in the fluoropolymer. It is common, however, for the as-polymerized fluoropolymer to have thermally unstable moieties, especially unstable end groups, arising from ingredients providing free radicals in the aqueous polymerization medium during the polymerization reaction. As many as or more than a total of 300 unstable end groups and more often at least 400 such end groups, —COOH, —COF, and/or —$CONH_2$, per $10^6$ carbon atoms can be present in the as-polymerized fluoropolymer. For example, the common persulfate polymerization initiator in the aqueous polymerization medium results in the formation of carboxyl end groups, —COOH, at the end of the polymer chain. These groups decompose at elevated temperatures, indicating the thermal instability of the fluoropolymer. The decomposition involves the splitting off of the carboxyl end groups, leaving behind the reactive group $CF_2^-$, which can lead to the formation of a new unstable end group, perfluorovinyl, —CF=$CF_2$, extending into the polymer chain. Before such destabilizable fluoropolymers are made available by the manufacturer for commercial use, the fluoropolymer is subjected to a stabilization process that replaces unstable end groups by stable end groups. This enables the fluoropolymer to be melt fabricated such as by melt extrusion without the formation of bubbles in the extrudate, arising from the decomposing fluoropolymer end groups. For an example of stabilization, FEP is subjected to humid heat treatment at high temperatures to replace unstable end groups by the stable —$CF_2$H end group. Both FEP and PFA are subjected to fluorination treatment to replace unstable end groups by the stable —$CF_3$ end group.

The destabilizable solid fluoropolymer used in the present invention is not subjected to any stabilization treatment, such as end-group stabilization, but is instead used in its thermally destabilizable form, i.e. the thermally unstable moieties such as the unstable end groups are present in the fluoropolymer. The heating up by the Li-ion battery caused by such corruption as improper recharging or short circuiting or other malfunction results in the heating of the solid fluoropolymer to cause decomposition of the fluoropolymer and unstable moieties. Thus, thermally destabilizable means that the fluoropolymer decomposes when exposed to heat generated by the corrupting of the Li-ion battery. This decomposition results in non-combustible volatiles being emitted from the fluoropolymer. These volatiles abate combustion, either preventing it from occurring, confining it if it does occur, or instantaneously extinguishing any fire that does occur.

A preferred destabilizable fluoropolymer is the FEP mentioned above, but with end groups not being stabilized, so as to possess the unstable end groups mentioned above.

Another embodiment of thermally destabilizable fluoropolymer is the fluoropolymer that contains thermally destabilizable groups, such as —$CH_2$—$CH_2$— or —$CH_2$— in the polymer chain in the small amount that provides thermal decomposition of the fluoropolymer without imparting flammability to the fluoropolymer. Such thermally unstable groups can be present in combination with thermally unstable end groups such as disclosed above. A preferred thermally destabilizable fluoropolymer that contains at least polymer (main) chain thermally instability is the copolymer of TFE, HFP and ethylene, with the amount of ethylene in the copolymer being small to satisfy the preferred maximum hydrogen contents mentioned above. The TFE and HFP contents of the TFE/HFP/ethylene copolymer can be the same as for the FEP dipolymer mentioned above.

The destabilizable fluoropolymer is preferably one that becomes flowable under the heating provided by the corrupted Li-ion battery. The thermally destabilizable fluoropolymers mentioned above, generally and specifically, are melt flowable. In the case of fluoropolymers that have a melting temperature, such heating exceeds the melting temperature. The fluoropolymer either softens sufficiently upon such heating that it becomes molten and flowable or melts to become melt flowable. The heating provided by the corrupted battery changes the fluoropolymer from the solid state to the liquid state. This flowing of the fluoropolymer, whether thermally destabilizable or non-thermally destabilizable,contributes to the exclusion of oxygen from combustible vapors arising from overheated electrolyte, and/or containment of the fire. The melt flow can be sufficient to seal the opening in the battery pack case from which combustible vapors would otherwise escape from the battery case.

The thermally destabilizable fluoropolymer can be used by itself as the fluorinated material abating combustion of the Li-ion battery, i.e. not mixed with fluorinated composition. One form of this fluoropolymer and other fluoropolymers disclosed above used by itself is as particulate filling material within the battery case, filling the space between the batteries in the case and the case interior. Another form of this fluoropolymer is a fabricated form such as a film, provided the fabrication does not decompose the fluoropolymer. A film of this fluoropolymer can be made by depositing an aqueous emulsion of particles of the fluoropolymer onto a surface, followed by drying to obtain the film. The film of thermally destabilizable fluoropolymer can be used for example as a wrap for the Li-ion battery, i.e. outside the can of the battery, or inside the can of the battery such as shown in FIG. 6. In either location, the thickness of the film is preferably 0.5 to 20 mils (12.5 to 500 micrometers), more preferably 2 to 15 mils (50 to 375 micrometers). In the inside the can application, it is preferred that the fluorinated material such as in film form is not in the path of the Li ions passing between anode and cathode. The current collector layers such as layers 78 and 82 of FIG. 6 provide separation from and shielding of the layers 76 (FIG. 6) of fluorinated material from the ionically active layers such as layers 80 and 84 (FIG. 6).

With respect to the application of the fluoropolymer as the material of construction of the battery pack case such as case 28 in FIGS. 3 and 4, or an interior liner therefor, the material of construction of the battery pack case can be any material that is nonflammable and provides the strength required for case integrity when subjected to expected use conditions. Fluoropolymer, however, is the preferred material of construction of the case and/or liner because of its contribution to combustion abatement. It is also preferred that the fluoropolymer as the material of construction of the battery case has a melting temperature of at least 240° C., preferably at least 280° C. Preferred fluoropolymers for this application are PFA and FEP as described above. The fluoropolymer, when PFA, can be thermally destabilizable or have thermally stable end groups and can be used as the material of construction of the case or as a lining such as of a metal case. When the fluoropolymer is not PFA as the material of construction of the battery case, it is preferred that such fluoropolymer, e.g. FEP, is not thermally destabilizable when used as the material of construction of the battery case, since this destabilization could occur in the melt fabrication of the case from the fluoropolymer. Both materials are also preferred materials for the liner of the case. The case may then be made of a non-fluoropolymer such as metal. The liner may be thermally stabilized or non-stabilized (destabilizable) fluoropolymer having the melting temperatures mentioned above.

With respect to the application of the fluoropolymer as film for providing a wrap for the Li-ion battery, this fluoropolymer can be the same as described above. The film can be thermally destablizable fluoropolymer or nonthermally destabilizable fluoropolymer such as the FEP with the unstable end groups replaced by stable end groups as described above. FEP film is preferred for this application, and when the film is FEP, it is preferably not thermally destabilizable, i.e. the FEP of the film is stabilized such as by end group stabilization mentioned above. The thickness of the film can be any thickness that provides the combustion abatement effect. For example, the film thickness can be 2 to 15 mils (50 to 375 micrometers).

When the fluoropolymer used for constructing or lining the battery case and for battery wrapping is not thermally destabilizable, such fluoropolymer nevertheless provides combustion abatement either by decomposition under the intense heating stemming from the corrupted battery or by melt flow excluding oxygen from the combustion source or by both effects. The difference between fluoropolymer that is (i) thermally destabilizable vs. (ii) non-thermally destabilizable is that chemical groups such as thermally unstable end groups and/or thermally unstable chemical bonds such as the C—H bond, as compared to the C—F bond are present in fluoropolymer (i) but not fluoropolymer (ii).

In another embodiment, the fluoropolymer film may also be made of polytetrafluoroethylene (PTFE), which is well known not to be melt flowable, i.e. this polymer does not flow in the molten state. PTFE refers to (a) the polymerized tetrafluoroethylene by itself without any significant comonomer present, i.e. homopolymer, and (b) modified PTFE, which is a copolymer of TFE with such small concentrations of comonomer that the melting point of the resultant polymer is not substantially reduced below that of PTFE. The modified PTFE contains a small amount of comonomer modifier which reduces crystallinity to improve processing but without becoming melt flowable. Examples of such monomers include perfluoroolefin, notably hexafluoropropylene (HFP) or perfluoro(alkyl vinyl ether) (PAVE), where the alkyl group contains 1 to 5 carbon atoms, with perfluoro (ethyl vinyl ether) (PEVE) and perfluoro(propyl vinyl ether) (PPVE) being preferred, chlorotrifluoroethylene (CTFE), perfluorobutyl ethylene (PFBE), or other monomer that introduces bulky side groups into the molecule. The concentration of such comonomer is preferably less than 1 wt %, more preferably less than 0.5 wt %, based on the total weight of the TFE and comonomer present in the PTFE. A minimum amount of at least 0.05 wt % is preferably used to have significant effect. The PTFE, including modified PTFE, can also be characterized by its high melting temperature, of at least 330° C., usually at least 331° C. and most often at least 332° C. (all 1st heat). The high melt viscosity of PTFE including modified PTFE arises from its extremely high molecular weight (Mn), e.g. at least $10^6$ and usually well in excess thereof, e.g. Mn of at least $2 \times 10^6$. The non-melt flowability of the PTFE, arising from this high molecular weight manifests itself as a melt flow rate (MFR) of 0 when measured in accordance with ASTM D 1238 at 372° C. and using a 5 kg weight. A better indicator of non-melt flowability is that the PTFE including modified PTFE has a melt creep viscosity of at least $1 \times 10^6$ Pa·s and preferably at least $1 \times 10^8$ Pa·s. The measurement of melt creep viscosity is disclosed in col. 4 of U.S. Pat. No. 7,763,680. While PTFE as the fluoropolymer film wrap for the Li-ion battery does not flow in the molten state, it is nevertheless subject to decomposition under the intense heating by corruption of the battery. The mass of PTFE present in the film and in the close proximity provided by contact with the battery nevertheless provides the combustion abatement effect. When the PTFE as the fluorinated material is in film form, the film is preferably non-porous and exhibits the hydrophobic character of PTFE (and other fluoropolymers such as FEP and PFA).

With respect to the fluorinated material when it comprises fluoropolyether, this is a preferred fluorinated composition for use as the fluorinated material. Preferred polyethers are the fluoropolyethers (FPE), preferably the perfluoropolyethers (PFPE), both of which can have any chain structure in which oxygen atoms in the backbone of the molecule are separated by saturated fluorocarbon groups having 1-3 carbon atoms, preferably perfluorocarbon groups. More than one type of fluorocarbon group may be present in the fluorinated composition molecule. The expression FPE is inclusive of PFPE. Representative FPE structures are

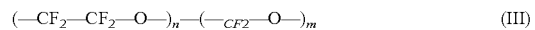

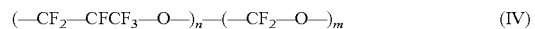

These structures are discussed by Kasai in J. Appl. Polymer Sci. 57, 797 (1995) and they are commercially available as certain KRYTOX® and FOMBLIN® products. Preferably the FPE has a carboxyl group at one end or at both ends of the chain structure of the FPE. For monocarboxyl FPE, the other end of the molecule is usually perfluorinated but may contain a hydrogen atom. FPE having a carboxyl group at one or both ends that can be used in the present invention have at least 2 ether oxygens, more preferably at least 4 ether oxygens, and even more preferably at least 6 ether oxygens, i.e. n in the formulae above is at least 2, 4, or 6 and m in the formulae above is at least 1, 2 or 3. Preferably, at least one of the fluorocarbon groups separating ether oxygens, and more preferably at least two of such fluorocarbon groups, has 2 or 3 carbon atoms. Even more preferably, at least 50% of the fluorocarbon groups separating ether oxygens have 2 or 3 carbon atoms. Also, preferably, the FPE has a total of at least 9 carbon atoms. The maximum value of n and m in the formulae above determines the physical state of the FPE. When the FPE is used by itself at the fluorinated material, i.e. is not mixed with any other material, the sum of n and m is preferably sufficient for the FPE to be at least semi-solid. While more than one FPE can be used as the fluorinated material preferably only one such FPE is used. The FPE is considered a composition, because as commercially available, the FPEs are usually a mixture of FPEs wherein the n or m value given is the average number of n and m groups present in the FPE.

The FPEs and especially the PFPEs have high thermal stability, even when carboxyl groups are present at one or both ends of the chain structure. The heat provided by the corrupted Li-ion battery, however, causes decomposition of the FPE, including its similar to the decomposition of the fluoropolymer having thermally unstable moieties such as carboxyl end groups. The decomposition products of the FPE are non-flammable volatiles that abate combustion similar to the effect of the fluoropolymers, including destabilizable fluoropolymers, described above.

With respect to when the fluorinated material is a mixture of fluorinated composition and other fluorinated material, the preferred fluorinated composition is the FPE described above, except that the sum of the values of n and m is sufficient that the FPE is not a gas under normal conditions of temperature and pressure mentioned above and preferably not a gas under the temperatures of normal operation of the Li-ion battery mentioned above. Preferably, the mixture is a semi-solid as described above under each of these conditions. In one embodiment, the semi-solid state of the mixture is obtained by the other fluorinated material of the mixture being solid and the fluorinated composition being liquid.

These components of the mixture are mixed together in proportions that yield the mixture being semi-solid. Thus, the molecular weight of the fluorinated composition is low enough that when mixed with the solid fluoropolymer, the semi-solid mixture is formed. According this embodiment, when the fluorinated composition is FPE, the sum of the value of n and m in the FPE formulae above is preferably such that the FPE is liquid. These liquid and solid states are with respect to the components of the mixture by themselves and these states and the semi-solid state are with respect to normal conditions and preferably under the conditions encountered in the normal operation of the Li-ion battery as mentioned above. The preferred liquid state for the fluorinated composition means that the fluorinated composition in the mixture has a higher boiling temperature than these temperatures and preferably has a boiling temperature of at least 100° C. at one atm pressure.

In one embodiment, the other fluorinated material in the mixture is the solid fluoropolymer that is preferably thermally destabilizable as described above. It is also preferred that this solid fluoropolymer is melt flowable.

In another embodiment with respect to the fluorinated composition being a mixture, the other fluorinated material can be the solid fluoropolymer that is low molecular weight PTFE, which is commonly known as PTFE micropowder, so as to distinguish from the PTFE described above. While the molecular weight of PTFE micropowder is low relative to PTFE, i.e. the molecular weight (Mn) of the micropowder is generally in the range of $10^4$ to $10^5$ to provide a solid polymer. The result of this lower molecular weight of PTFE micropowder is that it has fluidity in the molten state, i.e. melt flowability, in contrast to PTFE which is not melt flowable. The melt flowability of PTFE micropowder can be characterized by a melt flow rate (MFR) of at least 0.01 g/10 min, preferably at least 0.1 g/10 min and more preferably at least 5 g/10 min, and still more preferably at least 10 g/10 min, as measured in accordance with ASTM D 1238, at 372° C. using a 5 kg weight on the molten polymer. The fluoropolymers described above, including the thermally destabilizable fluoropolymers, but excluding PTFE, preferably are also characterized by these melt flow rates. While the low molecular weight of PTFE micropowder imparts melt flowability to the polymer, the PTFE micropowder by itself is not melt fabricable, i.e. an article molded from the melt of PTFE micropowder is useless, by virtue of extreme brittleness. Because of its low molecular weight (relative to non-melt-flowable PTFE), it has no strength. An extruded filament of PTFE micropowder is so brittle that it breaks upon flexing. Generally, compression molded plaques cannot be made for tensile or flex testing of PTFE micropowder, because of the inability to form tensile strength test specimens that have sufficient integrity to be tensile strength tested., whereby neither the tensile property nor MIT flex Life can be tested. In effect, this polymer has no (0) tensile strength and an MIT Flex Life of zero cycles. In contrast, PTFE is flexible, rather than brittle, as indicated e.g. by an MIT flex life (ASTM D-2176, using an 8 mil (0.21 mm) thick compression molded film) of at least 1000 cycles, preferably at least 2000 cycles. The melt flowable fluoropolymers, other than PTFE micropowder, also preferably exhibits this flex life, making them melt fabricable as well as being melt flowable.

The mixture of fluorinated composition and other fluorinated material and their preferred identities as described above can be made by mixing together the fluorinated composition, preferably as a liquid, with the other fluorinated material in the form of particles. The particles of the other fluorinated material can be those that result from the polymerization process to make the material, such as the solid fluoropolymer. For example, aqueous dispersion polymerization typically results in the formation of fluoropolymer particles having an average particle size of no greater than 0.5 micrometers as measured by laser light scattering. Recovery of the fluoropolymer particles from the aqueous polymerization medium results in aggregation of the primary particles from the polymerization process to form secondary particles of agglomerated primary particles, the secondary particles having an average particle size of 200 to 800 micrometers as measured by laser light scattering (ASTM D 4464). The PTFE micropowder generally has a smaller particle size than for the fluoropolymer secondary particles. Such smaller particle size is from 4 to 50 micrometers average particle size as measured by laser light scattering. Thus, the overall average particle size of the other fluorinated material, preferably is from 4 to 800 micrometers. The thermally destabilizable fluoropolymer when used by itself as a filling material can have this same particle size. This use as a filling material would replace the semi-solid coating 60 FIG. 3) and would fill substantially the entire space between the batteries 32, 34, 36, and 38 and the case 28.

The mixing process can be carried out at ambient temperature (15-25° C.) for convenience. The mixing can be carried out by hand or by mechanical means. The components are added to the mixing vessel and subjected to mixing. Since a solid is being mixed preferably with a liquid, the mixture is complete when no concentration of either component is visible. Instead, a homogeneously appearing mixture, that is preferably semi-solid, is obtained. The fluoropolymer particles will generally have a white color, and the fluorinated composition will generally be a colorless liquid, with the result being a mixture exhibiting a uniform white appearance.

Solid fluoropolymer is known for its non-stick characteristic, making it useful for non-stick cookware surfaces. Accompanying this characteristic is its incompatibility with other materials. Mixing together fluoropolymer particles with an incompatible liquid will not produce a homogeneous mixture. Instead, the incompatible liquid will simply drain from the fluoropolymer particles. Most organic solvents are incompatible with fluoropolymer, i.e. the particles will not dissolve in such solvents. The fluorinated composition in liquid form is compatible enough with the solid fluoropolymer in the form of particles to form a homogeneous, preferably semi-sold, mixture i.e. the liquid fluorinated composition does not drain from the mixture. The particle size of solid fluoropolymer is preferably that which is effective to produce a homogeneous semi-solid mixture with the fluorinated composition.

The proportions of each component in the mixture are adjusted to obtain the deformability of the mixture desired at the time the mixture is positioned with respect to the Li-ion battery, such as by forming into a coating on the Li-ion battery (batteries) and their connectors. For given fluoropolymer particles, the proportion of fluorinated composition will vary depending on the molecular weight of the composition as molecular weight affects liquid viscosity. While the coating of semi-solid mixture on the Li-ion battery (or connectors) may stiffen when the battery is used at extremely low temperatures, it is the deformability desired for the process of application to the battery and connectors, such as forming a coating of the semi-solid mixture on the Li-ion battery (batteries) or film wrapped around the battery, and on connectors that is sought in establishing the recipe for the mixture, especially to obtain the preferred semi-solid state for the mixture. For convenience, the process of applying the semi-solid mixture such as in a coating process, can be conducted at ambient temperature (15°-25° C.).

Preferably the mixture, most preferably semi-solid, comprises 4 to 96 wt % of each of the fluorinated composition and other fluorinated material components, based on the combined weight of these components to total 100 wt %. On the same basis, preferred proportions are complementally 5 to 95 wt % of the fluorinated composition and 95 to 5 wt % of the other fluorinated material, 10 to 90 wt % of the fluorinated composition and 90 to 10 wt % of the other fluorinated material, 50 to 90 wt % fluorinated composition and 90 to 50 wt % of other fluorinated material, 50 to 85 wt % fluorinated composition and 15 to 50 w % other fluorinated material, all based on the combined weight of these components of the mixture to total 100 wt %. The fluorinated composition and other fluorinated material components of the mixture in each of these proportions can have any of the identities disclosed above. With respect to each of these proportions, the preferred mixture is semi-solid, the preferred fluorinated composition is preferably a liquid, which is preferably fluoropolyether, including PFPE, and the preferred other fluorinated material comprises solid material, which is preferably fluoropolymer, more preferably thermally destabilizable fluoropolymer. PTFE micropowder is also an example of preferred solid fluoropolymer material in the mixture.

The thickness of the coating of semi-solid mixture formed on the Li-ion battery is preferably at least 25 micrometers (one mil). In the embodiment of FIGS. 3 and 4, a much thicker coating is formed.

The combination of fluorinated materials, such as whether (i) as a film and a coating of semi-solid fluorinated material on the film, or (ii) as a case or liner in combination with either the film or coating of (i), or (iii) as a mixture of fluorinated composition with other fluorinated material in combination with either (ii) or the film of (i) provides multiple defenses against combustion by the battery, such defenses preferably also arising from the different identities of the fluorinated materials providing different contributions to abating this combustion. The same is true in placement of the fluorinated material both inside and outside the can of the battery. The fluorinated material outside the battery can be in such forms as the case, case liner, film wrap and/or mixture of fluorinated composition individually or in combination, in further combination with fluorinated material, such as in the film form positioned with the battery can, such as interposed between the can, e.g. metal foil layers 74 and the current collector layer such as layers 78 and 82 (FIG. 6), i.e. between the can and the electrodes of the battery.

EXAMPLE 1

In this Example, the Li-ion batteries in the array shown in FIG. 3 are 4.8 v each, providing a voltage of 19.2 for the battery pack in a case. The fluorinated material is a semi-solid mixture comprising tetrafluoroethylene/hexafluoropropylene copolymer (FEP) having a melt flow rate (MFR) of 30 g/10 min and hexafluoropropylene content of 10 wt %. The copolymer has a molecular weight (Mn) exceeding 50,000 and has a melting temperature of 255° C. The mixture has the consistency of putty. The copolymer is in the form of secondary particles having an average particle size of about 300 micrometers. The copolymer is a solid copolymer exhibiting a tensile strength greater than 5 MPa and is thermally destabilizable as indicated by its end group population being greater than 500 unstable end groups/$10^6$ carbon atoms, at least 90% of which are —COOH and the remainder comprising —CONH$_2$. The mixture also comprises

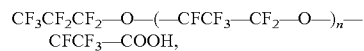

wherein n is an average of 14, providing a molecular weight of about 2500, as the fluorinated composition, which is liquid at ambient temperatures and has a boiling temperature exceeding 100° C. . These components are blended together in a 50:50 wt. ratio at ambient temperature and applied by hand troweling to the batteries and connectors (busses) within the battery pack case to achieve the coverage shown in FIGS. 3 and 4. The battery pack is equipped with thermocouples to monitor internal temperature at particular locations within the battery pack case. A nail is driven through the battery pack case to impale one of the Li-ion batteries to cause a short circuit. The impaled battery is one that is located adjacent to a thermocouple. The thermocouple reveals that the short circuiting of the battery by the nail is achieved, as the temperature measured by this thermocouple reveals a rapid increase in temperature. Vapor is visible exiting the case. The vapor ignites and it instantaneously doused by the semi-solid mixture coating.

EXAMPLE 2

The experiment of Example I is repeated except that the mixture is replaced by FEP film having a thickness of 6 mils (150 micrometers) wrapped around each battery, and the combustion abatement result is similar to that of Example 1.

EXAMPLE 3

The experiment of Example I is repeated except that the mixture is replaced by PTFE film having a thickness of 6 mils (150 micrometers) wrapped around each battery, and the combustion abatement result is similar to that of Example 1.

EXAMPLE 4

The experiment of Example 1 is repeated except each battery is first wrapped with the FEP film of Example 2 and then the mixture is applied to the batteries on top of the film wrap. The combustion abatement result is similar to that of Example 1.

EXAMPLE 5

The experiment of Example 1 is repeated except that the TFE/HFP copolymer is replaced by PTFE micropowder having an average particle size of 7 micrometers, and the proportion of micropowder is 25 wt % based on the combined weight of the micropowder and the FPE. The combustion abatement result is similar to that of Example 1.

EXAMPLE 6

The battery pack of Example 1 is used and tested as in Example 1, without the presence of the semi-solid mixture, but the battery pack case is made of PFA as the case material of construction. The combustion abatement result is similar to that of Example 1.

EXAMPLE 7

The experiments of Examples 4 and 6 are repeated, and the combustion abatement result using the combination of FEP film wrap and PFA case is similar to that of Example 1.

EXAMPLE 8

The Experiment of Example 1 is repeated except that the fluoropolyether of 2500 molecular weight is replaced by the fluoropolyether having the same molecular structure but with a greater number of n groups to provide a molecular weight of about 7500. The resultant semi-solid mixture provides similar combustion abatement results as Example 1.

EXAMPLE 9

The experiment of Example 8 is repeated except that the FEP is replaced by the PTFE micropowder of Example 5, and similar combustion abatement results are obtained.

EXAMPLE 10

The experiment of Example 2 is repeated except that the film 5 mil thick tetrafluoroethylene/hexafluoropropylene/ethylene copolymer, wherein the HFP content is 7.6 wt % and the weight of hydrogen provided by the ethylene copolymerized units is 0.13 wt %. The copolymer also has a smaller amount of hydrogen present (0.006 wt %) as $-C_2H_5$ end groups derived from using ethane as the chain transfer agent in the polymerization to make the copolymer. The copolymer has a molecular weight (Mn) exceeding 50,000 and an MFR of 30 g/10 sec. The film is made by compression molding at a temperature just above the 285° C. melting temperature of the copolymer. The combustion result is similar to that of Example 1.

EXAMPLE 11

The experiment of Example 10 is repeated except that the TFE/HFP/ethylene copolymer film is positioned inside the can, between it and the electrodes of the battery, and the combustion result is similar to Example 1.

The results of Examples 2-11 are stated as similar to Example 1 since the combustion abatement result is so quick that it is difficult to observe any difference in result.

What is claimed is:

1. A coated Li-ion battery comprising:
   a Li-ion battery; and
   a fluorinated material being a semi-solid and non-gaseous and non-liquid under normal conditions, said fluorinated material comprising a thermally destabilizable solid fluoropolymer and a liquid fluoropolyether, said thermally destabilizable solid fluoropolymer having at least 300 unstable end groups per $10^6$ carbon atoms, said unstable end groups being selected from the group consisting of $-COOH$, $-COF$, and $-CONH_2$, said fluorinated material being positioned as a coating on said Li-ion battery such that said fluorinated material is effective to abate combustion from said Li-ion battery.

2. The coated Li-ion battery of claim 1 wherein said fluorinated material is essentially free of binding function with respect to a nonfluorinated material.

3. The coated Li-ion battery of claim 2 wherein said fluorinated material contains no more than 15 wt % of the non-fluorinated material.

4. The coated Li-ion battery of claim 1 and additionally a case within which said Li-ion battery is contained, said fluorinated material including fluoropolymer forming at least the interior surface of said case.

5. The coated Li-ion battery of claim 1, said Li-ion battery including a can forming the housing of said Li-ion battery, and said fluorinated material is positioned inside and outside said can.

6. The coated Li-ion battery of claim 1 further comprising a fluoropolymer film in contact with said Li-ion battery.

7. The coated Li-ion battery of claim 6 wherein said fluorinated material in the semi-solid state forms a coating on said fluoropolymer film.

8. The coated Li-ion battery of claim 1 and additionally a case within which said battery is contained, said case having at least a fluoropolymer interior surface, and said Li-ion battery further comprising a fluoropolymer film in contact with said Li-ion battery.

9. The coated Li-ion battery of claim 1 wherein said liquid fluoropolyether under normal conditions is liquid but is present as a non-liquid mixture with said solid fluoropolymer under normal conditions.

10. The coated Li-ion battery of claim 1 wherein said coating on said Li-ion battery is directly on said Li-ion battery.

11. The coated Li-ion battery of claim 1 wherein heat preceding or accompanying said combustion decomposes said thermally destabilizable solid fluoropolymer to abate said combustion.

12. The coated Li-ion battery of claim 1 wherein decomposition of said thermally destabilizable solid fluoropolymer from heat accompanying said combustion results in non-combustible volatiles being emitted, said non-combustible volatiles abating said combustion.

13. The coated Li-ion battery of claim 12 wherein said non-combustible volatiles are emitted from said thermally destabilizable solid fluoropolymer.

14. The coated Li-ion battery of claim 12 wherein said non-combustible volatiles are decomposition products of said liquid fluoropolyether.

* * * * *